(12) United States Patent
Vijayasankar et al.

(10) Patent No.: US 9,008,124 B2
(45) Date of Patent: Apr. 14, 2015

(54) MAC PROTOCOLS WITH SUBBANDING

(75) Inventors: Kumaran Vijayasankar, Dallas, TX (US); Shu Du, San Jose, CA (US); Anand G. Dabak, Plano, TX (US); Badri N. Varadarajan, Mountain View, CA (US); Il Han Kim, Dallas, TX (US); Xiaolin Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 153 days.

(21) Appl. No.: 13/408,521

(22) Filed: Feb. 29, 2012

(65) Prior Publication Data

US 2012/0236876 A1 Sep. 20, 2012

Related U.S. Application Data

(60) Provisional application No. 61/453,007, filed on Mar. 15, 2011.

(51) Int. Cl.
*H04B 3/54* (2006.01)
*H04L 12/413* (2006.01)
*H04L 12/28* (2006.01)
*H04B 3/56* (2006.01)

(52) U.S. Cl.
CPC .......... *H04L 12/413* (2013.01); *H04L 12/2838* (2013.01); *H04L 2012/2843* (2013.01); *H04B 3/54* (2013.01); *H04B 3/56* (2013.01); *H04B 2203/5416* (2013.01); *H04B 2203/5466* (2013.01)

(58) Field of Classification Search
CPC .................................. H04B 3/54–3/58; H04B 2203/5405–2203/5425; H04B 2203/5466; H04L 12/2838; H04L 12/413; H04L 2012/2843

USPC .................................. 370/329–337, 445–448
See application file for complete search history.

(56) References Cited

U.S. PATENT DOCUMENTS

| | | | | |
|---|---|---|---|---|
| 2007/0155323 | A1* | 7/2007 | Matsumoto et al. | 455/39 |
| 2008/0075109 | A1* | 3/2008 | Zangi | 370/458 |
| 2009/0245195 | A1* | 10/2009 | Bhattad et al. | 370/329 |

(Continued)

OTHER PUBLICATIONS

IEEE Std 1901-2010, "IEEE Standard for Broadband over Power Line Networks: Medium Access Control and Physical Layer Specifications", published on Dec. 30, 2010, pp. 1-71.*

*Primary Examiner* — Khaled Kassim
*Assistant Examiner* — Zhaohui Yang
(74) *Attorney, Agent, or Firm* — Steven A. Shaw; Frank D. Cimino

(57) ABSTRACT

Systems and methods for designing, using, and/or implementing media access control (MAC) protocols with subbanding are described. In some embodiments, a method may include receiving a beacon packet during one of a plurality of beacon slots of a superframe, each beacon slot corresponding to one of a plurality of different downlink subbands. The method may also include identifying, based on the received beacon packet, contention access periods following the beacon slots, each of the contention access periods corresponding to one of a plurality of different uplink subbands. The method may further include transmitting an information packet over each of the plurality of uplink subbands during the contention access periods. Then, the method may include receiving, during a guaranteed time slot following the contention access periods, an indication of a selected one of the plurality of uplink subbands to be used in a subsequent communications.

18 Claims, 7 Drawing Sheets

(56) References Cited

U.S. PATENT DOCUMENTS

2010/0322327 A1* 12/2010 Caire et al. .................. 375/260
2011/0090880 A1* 4/2011 Abraham et al. ............. 370/338
2011/0134818 A1* 6/2011 Bae et al. ..................... 370/311

* cited by examiner

MAC PROTOCOLS WITH SUBBANDING

CROSS-REFERENCE TO RELATED APPLICATION

This application claims the benefit of the filing date of U.S. Provisional Patent Application No. 61/453,007 titled "MAC Protocol Design for Networks with Sub Banding Requirements Providing Optional Power Saving Abilities" and filed Mar. 15, 2011, the disclosure of which is hereby incorporated by reference herein in its entirety.

TECHNICAL FIELD

This specification is directed, in general, to network communications, and, more specifically, to systems and methods for designing, using, and/or implementing media access control (MAC) protocols with subbanding.

BACKGROUND

There are several different types of network communications available today. For example, power line communications (PLC) include systems for communicating data over the same medium (i.e., a wire or conductor) that is also used to transmit electric power to residences, buildings, and other premises. Once deployed, PLC systems may enable a wide array of applications, including, for example, automatic meter reading and load control (i.e., utility-type applications), automotive uses (e.g., charging electric cars), home automation (e.g., controlling appliances, lights, etc.), and/or computer networking (e.g., Internet access), to name only a few.

For each different type of communications network, different standardizing efforts are commonly undertaken throughout the world. For instance, in the case of PLC communications, systems may be implemented differently depending upon local regulations, characteristics of local power grids, etc. Examples of competing PLC standards include the IEEE 1901, HomePlug AV, and ITU-T G.hn (e.g., G.9960 and G.9961) specifications. Another PLC standardization effort includes, for example, the Powerline-Related Intelligent Metering Evolution (PRIME) standard designed for OFDM-based (Orthogonal Frequency-Division Multiplexing) communications.

SUMMARY

Systems and methods for designing, using, and/or implementing media access control (MAC) protocols with subbanding are described. In an illustrative, non-limiting embodiment, a first communication device may perform certain discovery and/or search operation(s). For example, a method may include receiving a beacon packet from a second communication device during one of a plurality of beacon slots of a superframe structure, each of the plurality of beacon slots corresponding to a different one of a plurality of downlink subbands. The method may also include identifying, based on the received beacon packet, a plurality of contention access periods following the plurality of beacon slots in the superframe structure, each of the plurality of contention access periods corresponding to a different one of a plurality of uplink subbands, the plurality of uplink subbands distinct from the plurality of downlink subbands. The method may also include transmitting, to the second communication device, an information packet over each of the plurality of uplink subbands during corresponding ones of the plurality of contention access periods. The method may further include receiving, from the second communication device during a guaranteed time slot following the plurality of contention access periods, an indication of a selected one of the plurality of uplink subbands to be used in a subsequent communication from the first communication device to the second communication device.

In some implementations, the first communication device may be a PLC device and the second communication device may be a PLC data concentrator. The method may also include, prior to receiving the beacon packet from the second communication device, sequentially scanning one or more of the plurality of downlink subbands. The method may further include selecting one of the plurality of downlink subbands to be used in the subsequent communication based, at least in part, upon the received beacon packet. For example, the information packet may include an indication of the selected one of the plurality of downlink subbands.

In some cases, the method may include receiving at least another beacon packet from the second communication device during at least another of the plurality of beacon slots, selecting among the received beacon packets based, at least in part, upon one or more link quality calculations, and selecting one of the plurality of downlink subbands to be used in the subsequent communication corresponding to the beacon slot of the selected beacon packet. For example, the information packet may include an indication of two or more beacon packets received over two or more beacon slots corresponding to respective ones of the plurality of downlink subbands, the method further comprising:

The method may also include receiving, from the second communication device during the guaranteed time slot following the plurality of contention access periods, an indication of a selected one of the plurality of downlink subbands to be used in a subsequent communication from the second communication device to the first communication device. The method may further include transmitting at least one of a preamble or header portion of a packet to the second communication device using the selected one of the plurality of uplink subbands, and transmitting a data portion of the packet to the second communication device spread across two or more of the plurality of uplink subbands, the preamble or header portion of the packet configured to identify the two or more of the plurality of uplink subbands. In addition, the method may include entering a power saving mode during one or more of the plurality of contention access periods not corresponding to the selected one of the plurality of uplink subbands.

In another illustrative, non-limiting embodiment, a PLC data concentrator or the like coupled to a medium-voltage (MV) power line may also perform certain discovery and/or search operation(s). For example, a method may include transmitting a beacon packet during each of a plurality of beacon slots of a superframe, each of the beacon packets transmitted over a different downlink subband. The method may also include receiving, from a first PLC device over a first set of one or more uplink subbands during a contention access period in the superframe following the plurality of beacon slots, a first set of one or more downlink subband selection packets, each of the first set of one or more downlink subband selection packets indicating a first set of one or more downlink subbands over which the first PLC device is capable of receiving beacon packets. (In some cases, the first set of one or more uplink subbands may have a non-overlapping frequency spectrum with respect to the first set of one or more downlink subbands.) The method may further include transmitting, to the first PLC device, a first information packet over one or more of the first set of one or more of downlink subbands during a guaranteed time slot in the superframe following the contention access period, the first information packet configured to instruct the first PLC device to use a selected one or more of the first set of one or more uplink subbands in a subsequent communication with the PLC modem.

In some implementations, each of the first set of one or more downlink subband selection packets may be sequentially received across a respective one of the first set of one or more uplink subbands. Additionally or alternatively, the first set of one or more downlink subband selection packets may be spread across two or more of the first set of one or more uplink subbands. Further, the selected one or more of the first set of one or more uplink subbands may be based, at least in part, upon a link quality calculation performed with respect to one or more of the first set of one or more downlink subband selection packets.

In other implementations, the first information packet may be transmitted over at least two of the first set of one or more downlink subbands. Additionally or alternatively, the first information packet may be spread across two or more of the first set of one or more downlink subbands.

In some cases, the method may include receiving a second set of one or more downlink subband selection packets from a second PLC device over a second set of one or more uplink subbands during the contention access period, each of the second set of downlink subband selection packets indicating a second set of one or more downlink subbands. The method may also include transmitting, to the second PLC device, a second information packet over one or more of the second set of one or more downlink subbands during a guaranteed time slot following the contention access period, the second information packet configured to instruct the second PLC device to use a selected one or more of the second set of one or more uplink subbands in a subsequent communication with the PLC modem. For instance, if the first set of uplink subbands overlaps, at least in part, with the second set of uplink subbands, then the second information packet may instruct the second PLC device to use a different set of one or more uplink subbands than the first PLC device.

In yet another illustrative, non-limiting embodiment, a method may include identifying a plurality of contention access periods following a plurality of beacon slots in a superframe structure, each of the plurality of contention access periods corresponding to a different one of a plurality of uplink subbands. The method may also include receiving, during a guaranteed time slot following the plurality of contention access periods, an indication of a selected one or more of the plurality of uplink subbands to be used in a subsequent communication. The method may further include entering a power saving mode during one or more of the plurality of contention access periods corresponding to other than the selected one or more of the plurality of uplink subbands.

In some implementations, the method may include receiving a beacon packet during at least one of the plurality of beacon slots, each beacon packet received over a different one of a plurality of downlink subbands, the plurality of downlink subbands different from the plurality of uplink subbands. Additionally or alternatively, the method may include receiving a beacon packet during at least one of the plurality of beacon slots, each beacon packet spread over two or more of a plurality of downlink subbands, the plurality of downlink subbands different from the plurality of uplink subbands.

In some embodiments, one or more communication devices (e.g., PLC devices) or computer systems may perform one or more of the techniques described herein. In other embodiments, a tangible computer-readable or electronic storage medium may have program instructions stored thereon that, upon execution by one or more communication devices or computer systems, cause the one or more communication devices or computer systems to execute one or more operations disclosed herein. In yet other embodiments, a communication system (e.g., a PLC modem) may include at least one processor and a memory coupled to the at least one processor. Examples of a processor include, but are not limited to, a digital signal processor (DSP), an application specific integrated circuit (ASIC), a system-on-chip (SoC) circuit, a field-programmable gate array (FPGA), a microprocessor, or a microcontroller. The memory may be configured to store program instructions executable by the at least one processor to cause the system to execute one or more operations disclosed herein.

BRIEF DESCRIPTION OF THE DRAWINGS

Figure 1:
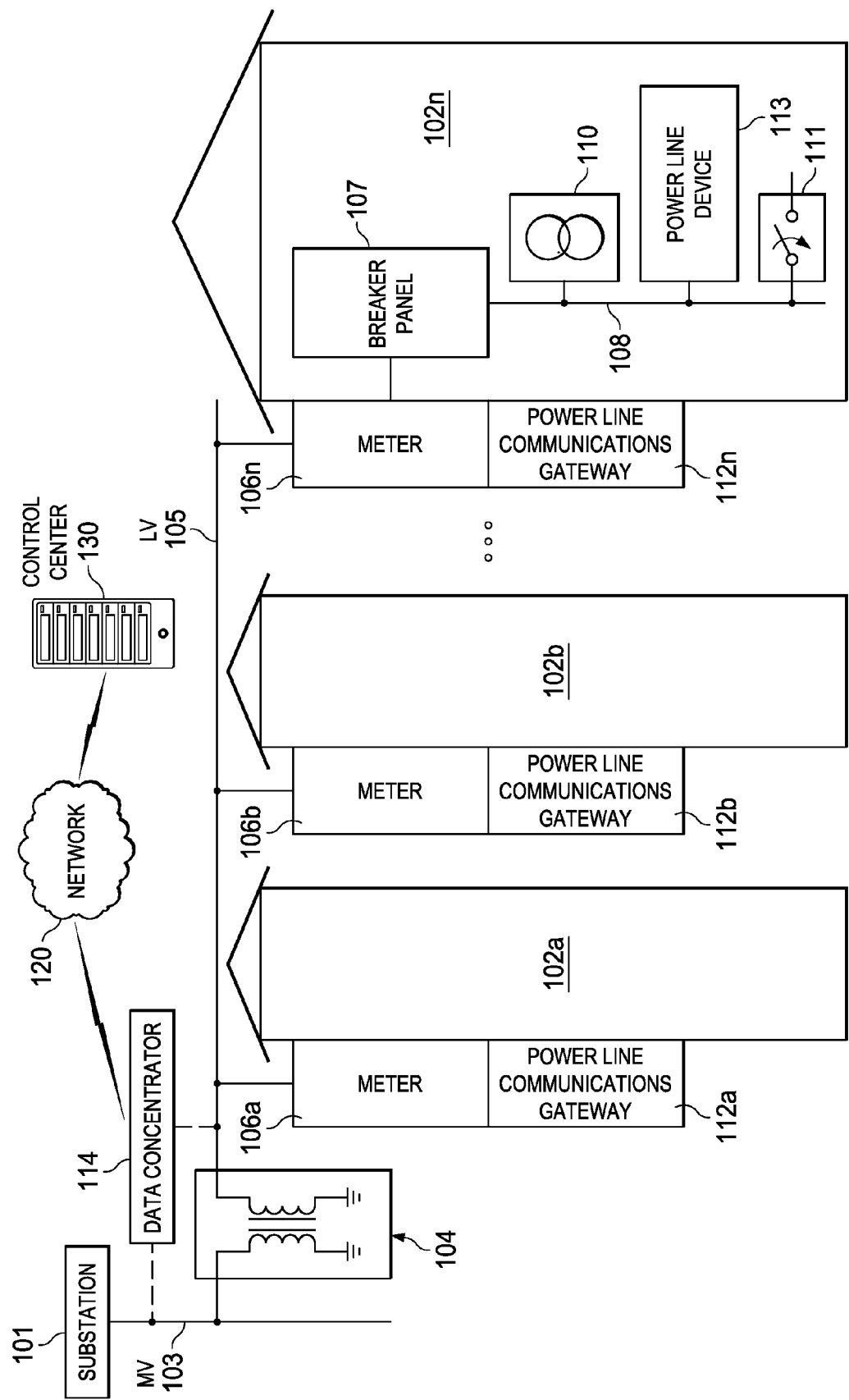

Having thus described the invention(s) in general terms, reference will now be made to the accompanying drawings, wherein:

FIG. 1 is a block diagram of a power line communication (PLC) environment according to some embodiments.

Figure 2:
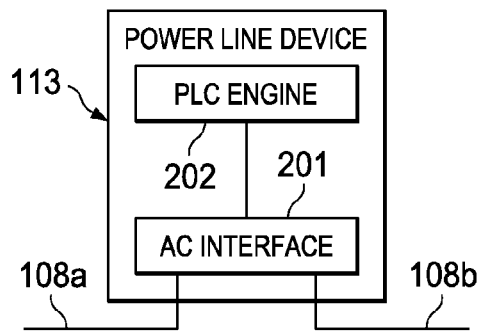

FIG. 2 is a block diagram of a PLC device or modem according to some embodiments.

Figure 3:
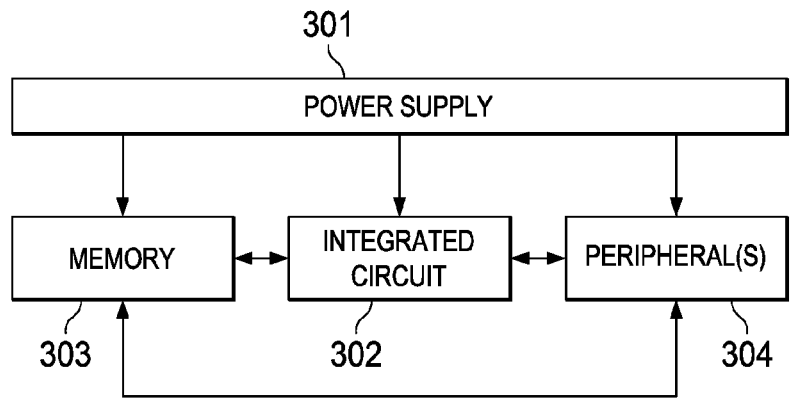

FIG. 3 is a block diagram of an integrated circuit according to some embodiments.

Figure 4:
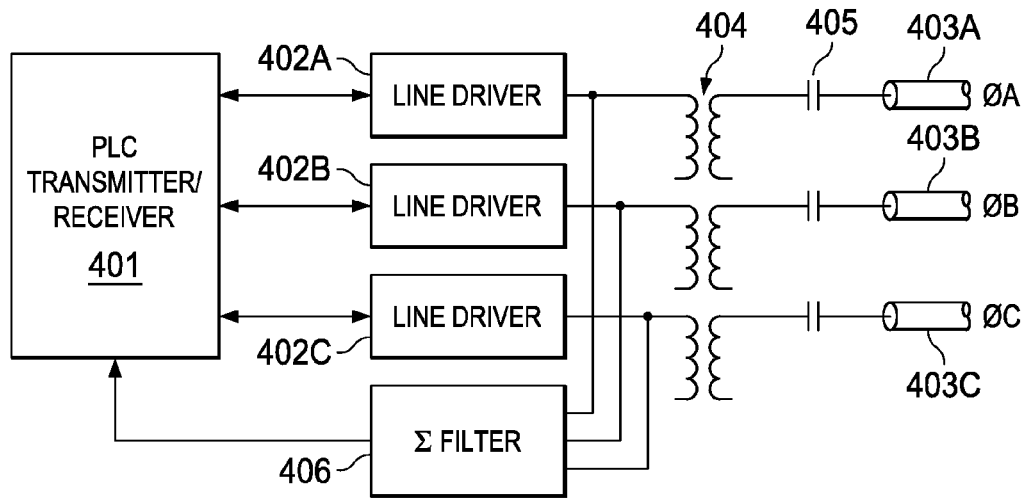
Figure 5:
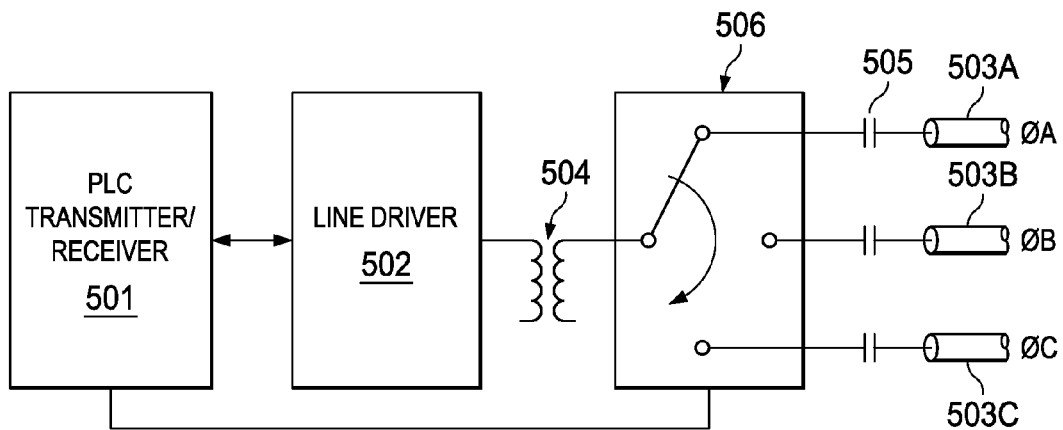
Figure 6:
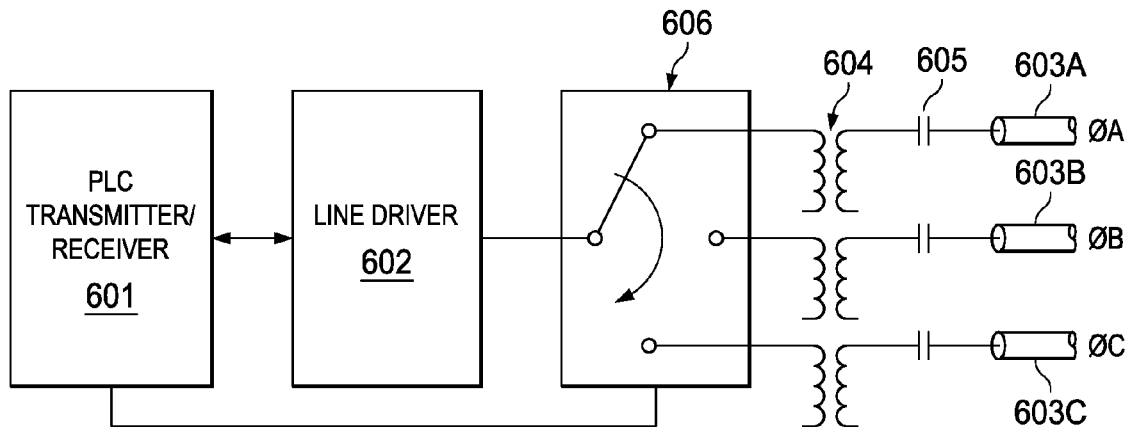

FIGS. 4-6 are block diagrams illustrating connections between a PLC transmitter and/or receiver circuitry to three-phase power lines according to some embodiments.

Figure 7:
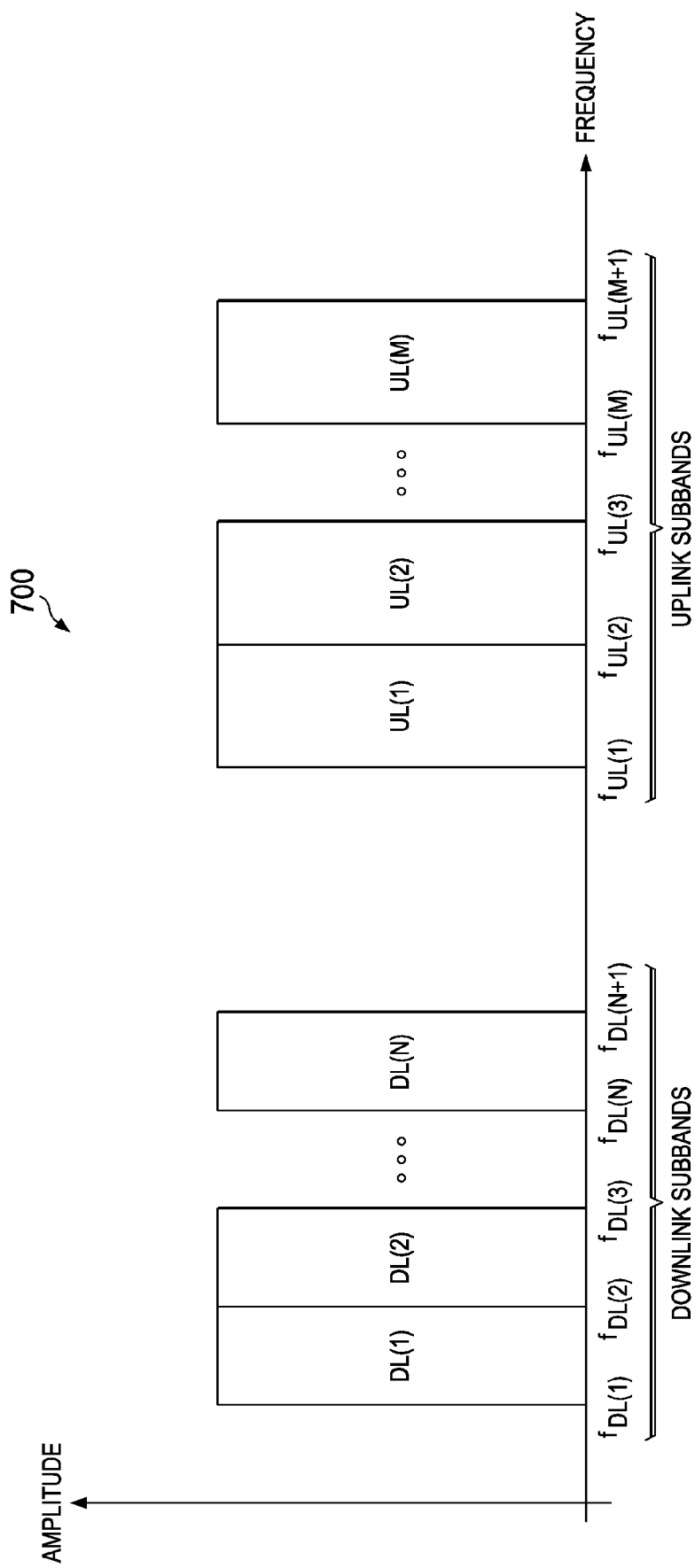

FIG. 7 is a graphical representation of downlink and uplink subbands usable in PLC communications according to some embodiments.

Figure 8:
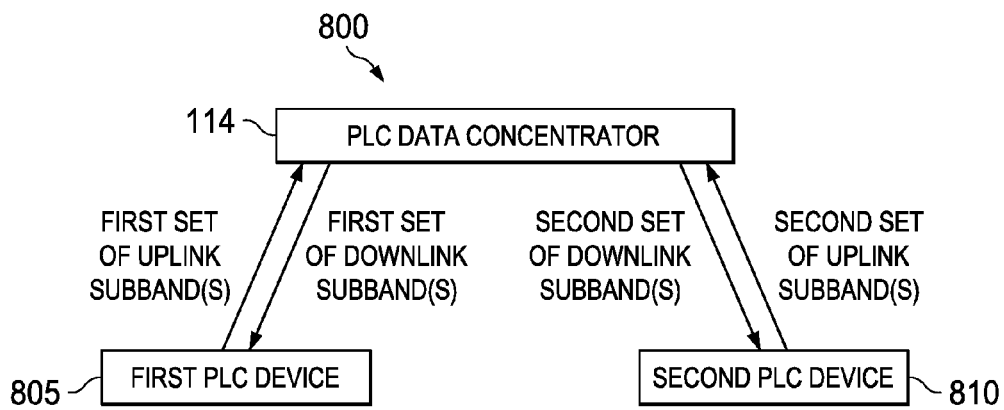

FIG. 8 is a block diagram of different entities participating in PLC communications according to some embodiments.

Figure 9:
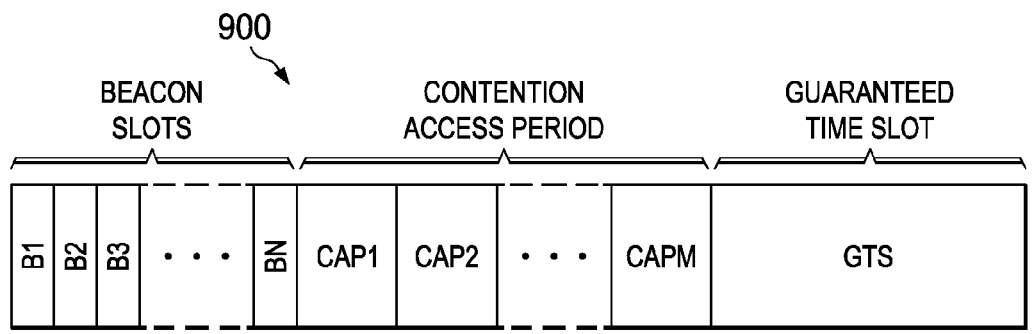

FIG. 9 is a diagram of a superframe suitable for narrowband PLC communications according to some embodiments.

Figure 10:
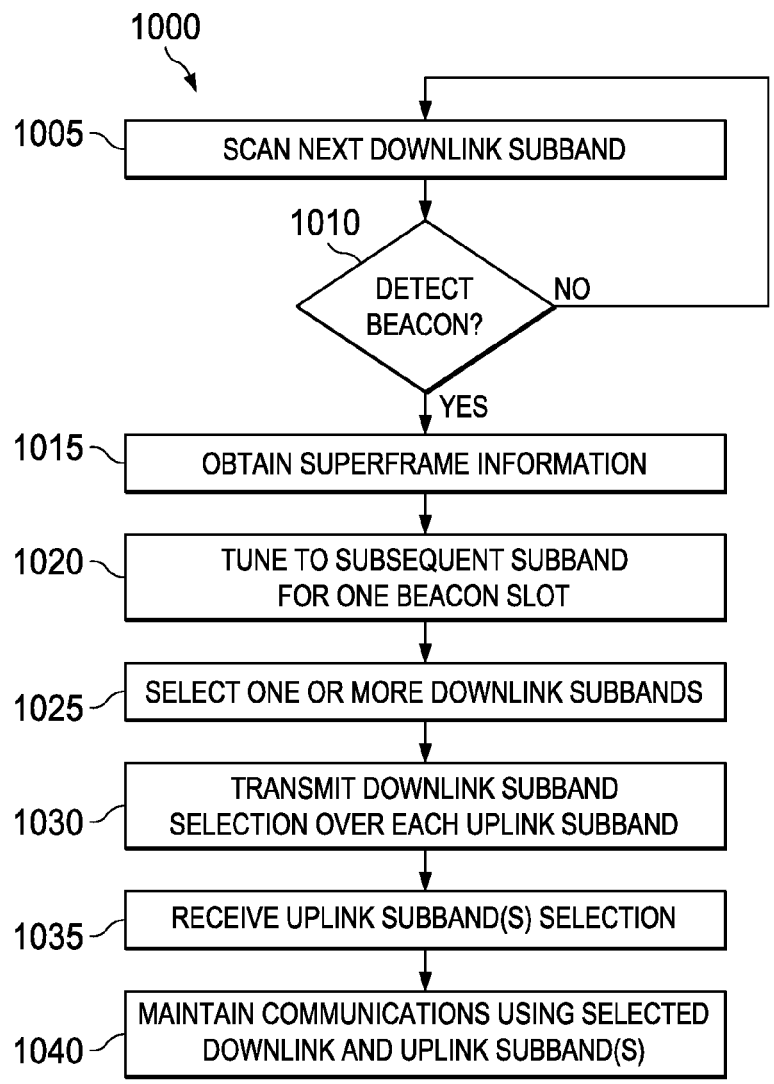

FIG. 10 is a flowchart of discovery operations performed by a PLC device according to some embodiments.

Figure 11:
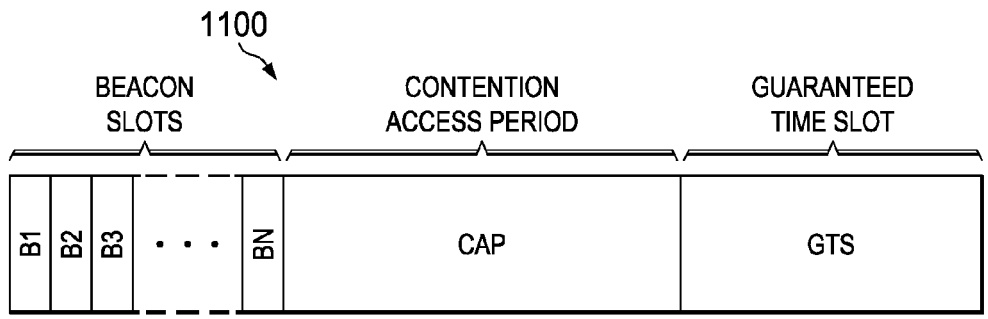

FIG. 11 is a diagram of a superframe suitable for wideband PLC communications according to some embodiments.

Figure 12:
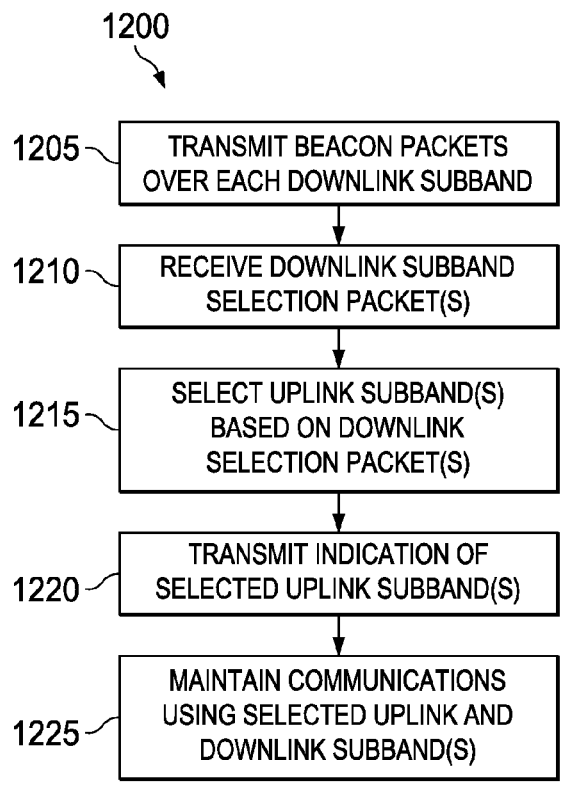

FIG. 12 is a flowchart of discovery operations performed by a PLC data concentrator according to some embodiments.

Figure 13:
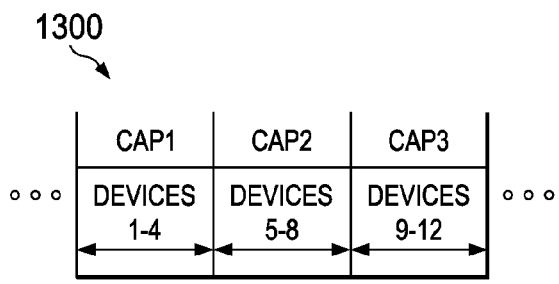

FIG. 13 is a diagram of a portion of a superframe illustrating PLC device allocations according to some embodiments.

Figure 14:
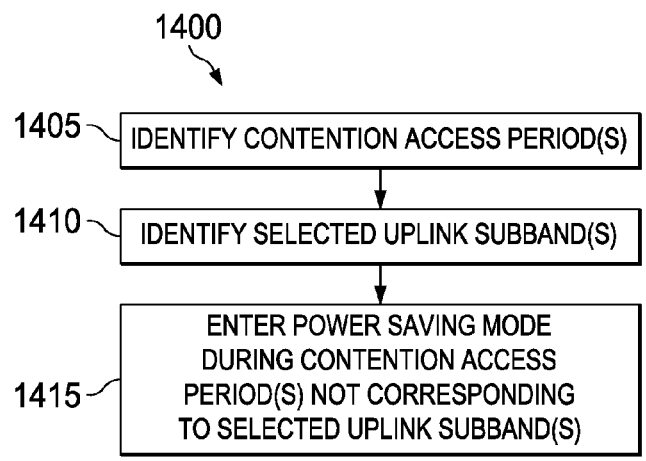

FIG. 14 is a flowchart of power saving operations performed by a PLC device according to some embodiments.

Figure 15:
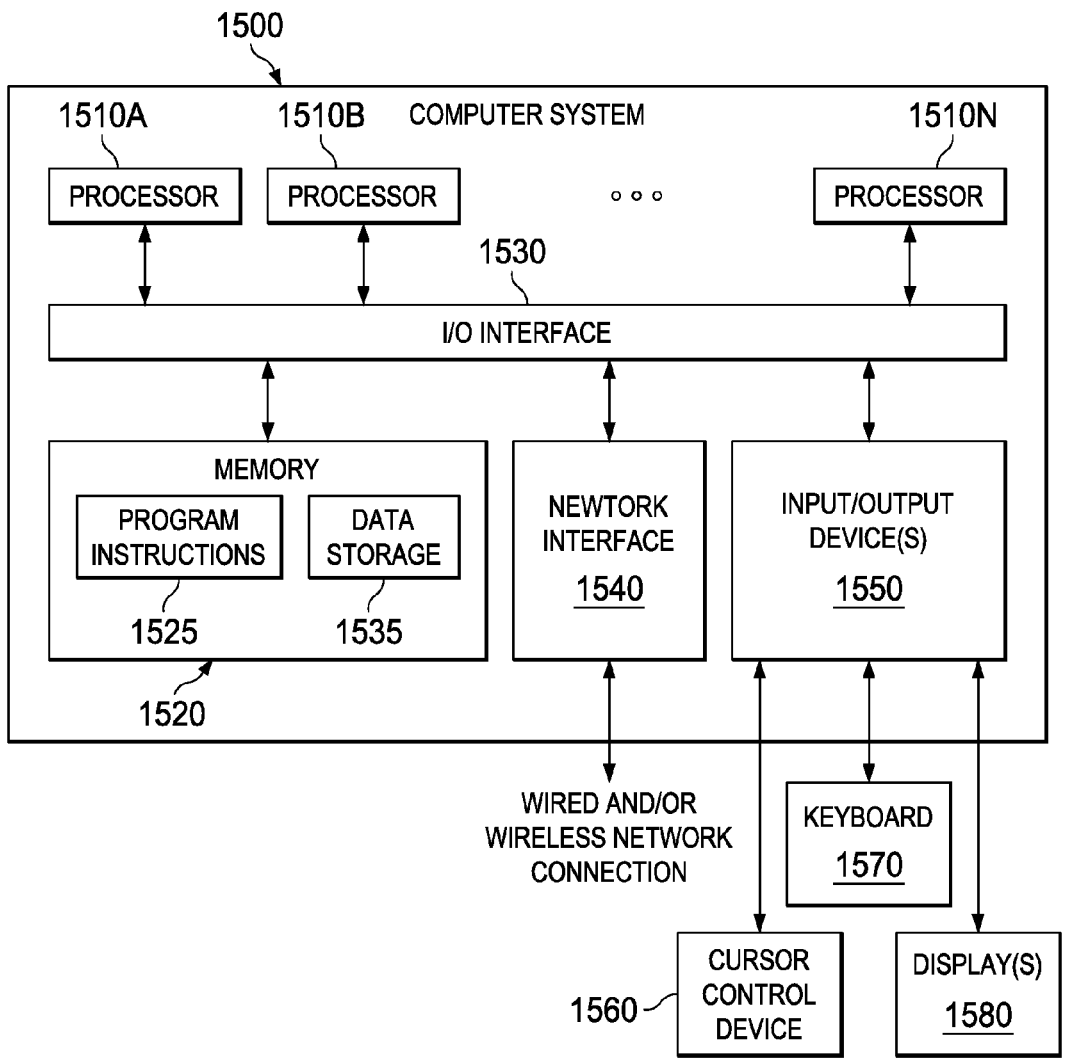

FIG. 15 is a block diagram of a computing system configured to implement certain systems and methods described herein according to some embodiments.

DETAILED DESCRIPTION

The invention(s) now will be described more fully hereinafter with reference to the accompanying drawings. The invention(s) may, however, be embodied in many different forms and should not be construed as limited to the embodiments set forth herein. Rather, these embodiments are provided so that this disclosure will be thorough and complete, and will fully convey the scope of the invention(s) to a person of ordinary skill in the art. A person of ordinary skill in the art may be able to use the various embodiments of the invention(s).

In various embodiments, the systems and methods described herein may be used to design and/or implement media access control (MAC) protocols with subbanding. Generally speaking, these systems and methods may be applicable to a wide variety of communication environments, including, but not limited to, those involving wireless communications (e.g., cellular, Wi-Fi, WiMax, etc.), wired communications (e.g., Ethernet, etc.), power line communications (PLC), or the like. For ease of explanation, several examples discussed below are described specifically in the context of PLC. As a person of ordinary skill in the art will recognize in light of this disclosure, however, certain techniques and principles disclosed herein may also be applicable to other communication environments.

Turning now to FIG. 1, an electric power distribution system is depicted according to some embodiments. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. (Although referred to as "residences," premises 102a-n may include any type of building, facility or location where electric power is received and/or consumed.) A breaker panel, such as panel 107, provides an interface between meter 106n and electrical wires 108 within residence 102n. Electrical wires 108 deliver power to outlets 110, switches 111 and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use, for example, a carrier signal having a frequency different from that of the power signal. The carrier signal may be modulated by the data, for example, using an orthogonal frequency division multiplexing (OFDM) scheme or the like.

PLC modems or gateways 112a-n at residences 102a-n use the MV/LV power grid to carry data signals to and from PLC data concentrator 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may enable AC or DC charging of electric vehicles and other appliances. An example of an AC or DC charger is illustrated as PLC device 113. Outside the premises, power line communication networks may provide street lighting control and remote power meter data collection.

One or more data concentrators 114 may be coupled to control center 130 (e.g., a utility company) via network 120. Network 120 may include, for example, an IP-based network, the Internet, a cellular network, a Wi-Fi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

In some embodiments, each concentrator 114 may be seen as a base node for a PLC domain, each such domain comprising downstream PLC devices that communicate with control center 130 through a respective concentrator 114. For example, in FIG. 1, device 106a-n, 112a-n, and 113 may all be considered part of the PLC domain that has data concentrator 114 as its base node; although in other scenarios other devices may be used as the base node of a PLC domain. In a typical situation, multiple nodes may be deployed in a given PLC network, and at least a subset of those nodes may be tied to a common clock through a backbone (e.g., Ethernet, digital subscriber loop (DSL), etc.). Further, each PLC domain may be coupled to MV line 103 through its own distinct transformer similar to transformer 104.

Still referring to FIG. 1, meter 106, gateways 112, PLC device 113, and data concentrator 114 may each be coupled to or otherwise include a PLC modem or the like. The PLC modem may include transmitter and/or receiver circuitry to facilitate the device's connection to power lines 103, 105, and/or 108.

FIG. 2 is a block diagram of PLC device or modem 113 according to some embodiments. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. As noted above, in some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.).

PLC engine 202 may be configured to transmit and/or receive PLC signals over wires 108a and/or 108b via AC interface 201 using a particular channel or frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data concentrators 114, etc.) for further processing. Conversely, PLC engine 202 may receive instructions and/or other information from such higher-level PLC devices encoded in PLC signals, for example, to allow PLC engine 202 to select a particular frequency band in which to operate.

In various embodiments, PLC device 113 may be implemented at least in part as an integrated circuit. FIG. 3 is a block diagram of such an integrated circuit. In some cases, one or more of meter 106, gateway 112, PLC device 113, or data concentrator 114 may be implemented similarly as shown in FIG. 3. For example, integrated circuit 302 may be a digital signal processor (DSP), an application specific integrated circuit (ASIC), a system-on-chip (SoC) circuit, a field-programmable gate array (FPGA), a microprocessor, a microcontroller, or the like. As such, integrated circuit 302 may implement, at least in part, at least a portion of PLC engine 202 shown in FIG. 2. Integrated circuit 302 is coupled to one or more peripherals 304 and external memory 303. Further, integrated circuit 302 may include a driver for communicating signals to external memory 303 and another driver for communicating signals to peripherals 304. Power supply 301 is also provided which supplies the supply voltages to integrated circuit 302 as well as one or more supply voltages to memory 303 and/or peripherals 304. In some embodiments, more than one instance of integrated circuit 302 may be included (and more than one external memory 303 may be included as well).

Peripherals 304 may include any desired circuitry, depending on the type of PLC device or system. For example, in some embodiments, peripherals 304 may implement, at least in part, at least a portion of a PLC modem (e.g., portions of AC interface 210 shown in FIG. 2). Peripherals 304 may also include additional storage, including RAM storage, solid-state storage, or disk storage. In some cases, peripherals 304 may include user interface devices such as a display screen, including touch display screens or multi-touch display screens, keyboard or other input devices, microphones, speakers, etc. External memory 303 may include any type of memory. For example, external memory 303 may include SRAM, nonvolatile RAM (NVRAM, such as "flash" memory), and/or dynamic RAM (DRAM) such as synchronous DRAM (SDRAM), double data rate (DDR, DDR2, DDR3, etc.) SDRAM, etc. External memory 303 may include one or more memory modules to which the memory devices are mounted, such as single inline memory modules (SIMMs), dual inline memory modules (DIMMs), etc.

In various implementations, PLC device or modem 113 may include transmitter and/or receiver circuits configured to connect to power lines 103, 105, and/or 108. FIG. 4 illustrates a connection between the power line communication transmitter and/or receiver circuitry to the power lines according to some embodiments. PLC transmitter/receiver 401 may function as the transmitter and/or receiver circuit. When PLC transmitter/receiver 401 operates as a transmitter, it may generate pre-coded signals for transmission over the power line network. Each output signal, which may be a digital signal, may be provided to a separate line driver circuit 402A-C. Line drivers 402A-C may comprise, for example, digital-to-analog conversion circuitry, filters, and/or line drivers that couple signals from PLC transmitter/receiver 401 to power lines 403A-C. Transformer 404 and coupling capacitor 405 link each analog circuit/line driver 402 to its respective power line 403A-C. Accordingly, in the embodiment illustrated in FIG. 4, each output signal is independently linked to a separate, dedicated power line. Conversely, when PLC transmitter/receiver 401 operates as a receiver, coded signals may be received on power lines 403A-C, respectively. In an embodiment, each of these signals may be individually received through coupling capacitors 405, transformers 404, and line drivers 402 to PLC transmitter/receiver 401 for detection and receiver processing of each signal separately. Alternatively, the received signals may be routed to summing filter 406, which combines all of the received signals into one signal that is routed to PLC transmitter/receiver 401 for receiver processing.

FIG. 5 illustrates an alternative embodiment in which PLC transmitter/receiver 501 is coupled to a single line driver 502, which is in turn coupled to power lines 503A-C by a single transformer 504. All of the output signals are sent through line driver 502 and transformer 504. Switch 506 selects which power line 503A-C receives a particular output signal. Switch 506 may be controlled by PLC transmitter/receiver 501. Alternatively, switch 506 may determine which power line 503A-C should receive a particular signal based upon information, such as a header or other data, in the output signal. Switch 506 links line driver 502 and transformer 504 to the selected power line 503A-C and associated coupling capacitor 505. Switch 506 also may control how received signals are routed to PLC transmitter/receiver 501.

FIG. 6 is similar to FIG. 5 in which PLC transmitter/receiver 1901 is coupled to a single line driver 1902. However, in the embodiment of FIG. 6, power lines 603A-C are each coupled to a separate transformer 604 and coupling capacitor 605. Line driver 602 is coupled to the transformers 604 for each power line 603 via switch 606. Switch 606 selects which transformer 604, coupling capacitor 605, and power line 603A-C receives a particular signal. Switch 606 may be controlled by PLC transmitter/receiver 601, or switch 606 may determine which power line 603A-C should receive a particular signal based upon information, such as a header or other data, in each signal. Switch 606 also may control how received signals are routed to PLC transmitter/receiver 601.

In some embodiments, the systems described above (and/or the computer system shown in FIG. 15) may be configured to design, use, and/or implement a media access control (MAC) data communication protocol. Generally speaking, the MAC protocol is a sub-layer of the data link layer specified in the seven-layer Open Systems Interconnection (OSI) model. As such, a MAC protocol typically provides addressing and channel access control mechanisms that enable terminals or network nodes (e.g., modems, etc.) to communicate over a shared medium (i.e., a power line, electromagnetic spectrum, etc.). Various aspects of a MAC protocol, as described herein, may be used with frequency subbanding. In the case of PLC, for example, a PLC device may be configured to transmit signals to a PLC data concentrator (from the "LV" line to the "MV" line, that is, in an "uplink" direction) in one or more bands of a first set of tone masks, frequency bands, or subbands (or "uplink subbands"). The PLC device may also be configured to receive signals from the PLC data concentrator (from the "MV" line to the "LV" line, that is, in an "downlink" direction) in one or more bands of a second set of tone masks, frequency bands, or subbands (or "downlink subbands"). In some implementations, the first set of frequency bands may be at least in part distinct with respect to the second set of frequency bands. In other implementations, the first set of frequency bands may be completely non-overlapping with respect to the second set.

FIG. 7 is a graphical representation of downlink and uplink subbands usable in PLC communications according to some embodiments. As illustrated in graph 700, there may be N downlink subbands (DL(1), DL(2), . . . , DL(N)) and M uplink subbands (UL(1), UL(2), . . . , UL(M)) usable across a PLC network. Generally speaking, M and N are integers and may be different each other. In some cases, the width of each downlink subband may also be different from each other—e.g., $(f_{DL(2)}-f_{DL(1)}) \neq (f_{DL(3)}-f_{DL(2)})$. Similarly, uplink subbands may also have different spectral widths—e.g., $(f_{UL(2)}-f_{UL(1)}) \neq (f_{UL(3)}-f_{UL(2)})$. Although the example shown in graph 700 has downlink subbands occupying a lower portion of the spectrum than the uplink subbands, other examples may have the uplink subbands occupying the lower portion and the downlink subbands occupying the higher portion. In yet other examples, downlink and uplink subbands may be interspersed (e.g., alternating) such that one or more uplink subbands are located between two downlink subbands and vice versa. Additionally or alternatively, one or more downlink and uplink subbands may overlap at least in part.

In other words, UL subbands and DL subbands may represent different ways of splitting the same bandwidth. For sake of illustration, in a non-limiting example, a 100-500 KHz spectrum may be split into the following DL subbands: 100-250 KHz, 250-500 KHz and following UL sub bands, 100-200 KHz, 200-300 KHz, 300-400 KHz, 400-500 KHz. Also, one of more of these various DL and UL subbands may be the same, in some cases.

FIG. 8 is a block diagram of different entities participating in PLC communications according to some embodiments. As illustrated in diagram 800, PLC data concentrator 114 may have an MV modem coupled to an MV power line, and may therefore communicate with first PLC device 805 and second PLC device 810. Both PLC devices 805 and 810 may include LV modems coupled to the same or different LV power lines (e.g., separated by one or more transformers). First PLC device 805 may receive packets from PLC data concentrator 114 using a first set of downlink subbands. In some cases, communication conditions (e.g., noise, interference, etc.) may be such that, from the perspective of PLC device 805, one or more of the available downlink subbands may yield a better signal-to-noise ratio than other downlink subbands. First PLC device 805 may also transmit packets to PLC data concentrator 114 using a first set of uplink subbands. Here, from the perspective of PLC data concentrator 114, one or more of the available uplink subbands may yield better a better signal-to-noise ratio. Also, because PLC data concentrator 114 may receive transmission from a number of PLC devices, different sets of uplink subbands may be allocated to these different devices to reduce contention and potential collisions that may potentially negatively impact desired data rates, etc.

Second PLC device 810 may transmit packets to PLC data concentrator 114 using a second set of uplink subbands, and it may receive packets from PLC data concentrator 114 using a second set of downlink subbands. In some cases, the first set of uplink subbands may be at least partially non-overlapping and/or entirely distinct from the second set of uplink subbands. Similarly, the first set of downlink subbands may be at least partially non-overlapping and/or entirely distinct from the second set of downlink subbands. Moreover, in some implementations, PLC data concentrator 114 and/or PLC devices 805-810 may be configured to process uplink and/or downlink signals from only one subband at a time ("narrowband"). In other implementations, PLC data concentrator 114 and/or PLC devices 805-810 may be configured to process uplink and/or downlink signals from two or more subbands at a time ("wideband"). When operating in wide band mode, a given PLC device may be capable of transmitting and/or receiving packets spread across two or more uplink or downlink subbands using a suitable signal spreading algorithm. It should be noted that, although only three PLC devices 805-815 are shown in FIG. 8, a typical implementation may include any number of PLC devices (e.g., dozens of devices) coupled to a same PLC data concentrator. Also, PLC data concentrator 114 may allocate different UL subbands to different devices, for example, based on each individual node's UL quality.

To facilitate communications among the devices described above, each device may implement a MAC protocol configured to coordinate inter-device communications according to a "superframe." Such a superframe may define the duration and/or relative times for transmission and/or receipt of different types of information by each device. For example, FIG. 9 is a diagram of a superframe suitable for narrowband PLC communications according to some embodiments. As shown, superframe 900 includes N downlink beacon time slots ($B_1$, $B_2$, $B_3$, . . . , $B_N$). Each beacon slot may correspond to an available downlink subband in the PLC network. During each beacon time slot, a PLC data concentrator may transmit one or more beacon packets. For sake of illustration, a first beacon packet may be transmitted during beacon slot $B_1$ over downlink subband DL(1), a second beacon packet may be transmitted during beacon slot $B_2$ over downlink subbands DL(2), and so on until N beacon packets have been transmitted over each of the N downlink subbands. Moreover, each beacon packet may include information that identifies the particular beacon slot over which it was sent and/or it may indicate the length, position, and/or duration of other elements (e.g. other beacon slots, CAP slots, GTS slots, etc.) in superframe 900. Accordingly, in some embodiments, once a listening PLC device receives any given beacon packet, the structure and/or timing of superframe 900 may also be acquired.

After beacon slots $B_{1-N}$, superframe 900 may allocate a plurality of contention access period (CAP) slots to allow one or more PLC devices to transmit packets to the PLC data concentrator in the uplink direction. As such, each CAP slot ($CAP_1$, $CAP_2$, . . . , $CAP_M$) may be allocated to a respective one of the M uplink subbands available in the PLC network. In a general case, any PLC device may be allowed to transmit packets to the PLC data concentrator during any of the CAP slots; although in some cases the PLC data concentrator may assign CAP slots to different PLC devices to reduce collisions (shown below in FIG. 13). When PLC devices transmit packets to a PLC concentrator during one or more CAP slots without specific assignments, they may implement, for example, a carrier sense multiple access (CSMA) technique or the like.

A guaranteed time slot (GTS) or contention free period (CFP) may follow the CAP slots in superframe 900. During the GTS slot, a PLC data concentrator may allocate different time periods to specific PLC devices for uplink and/or downlink communications. In some embodiments, GTS or CFP portion may include a poll access period and a poll-based GTS or CFP slot (not shown).

FIG. 10 is a flowchart of discovery operations performed by a PLC device or node. In some embodiments, method 1000 may be performed in connection with superframe 900 described in FIG. 9. At block 1005, method 1000 may include scanning or listening to beacon packets over a downlink subband. For example, a PLC data concentrator or the like may transmit one or more beacon packets. At block 1010, method 1000 may include determining whether a beacon packet has been detected (e.g., over one of beacon slots $B_1$, $B_2$, $B_3$, . . . , $B_N$). If not, then control may return to block 1005 and method 1000 may scan a subsequent one of downlink subbands $DL_{1-N}$.

If a beacon packet is detected at block 1010, method 1000 may include obtaining superframe information (e.g., beginning and/or ending of other beacon slots, CAP slots, and/or GTS slots, etc.) encoded within the beacon packet at block 1015. Thus, at block 1020, method 100 may include tuning a receiver to the subsequent subband for the next beacon slot in superframe 900. At block 1025, method 1000 may include selecting one or more downlink subbands for future communications sent by the PLC data concentrator. For instance, the receiving PLC device may perform a link quality calculation with respect to two or more received beacon packets over corresponding downlink subbands (e.g., signal-to-noise ratio (SNR), received signal strength indicator (RSSI), signal-to-interference (S/I or SIR), etc.), and select one or more such subbands based on those calculations.

For example, a DL subband scan may allow one or more devices to generate a DL subband quality report that contains information about the received signal-quality on each subband. It may then be used by the PLC data concentrator to choose a good or optimal DL subband. The device may first set its receiver (RX) to the first subband. It may then wait for one maximum superframe ("maxSuperframe") duration. During this time, all non-beacon frames may be discarded. If no beacons are received during this time, it may imply either that this subband is not suitable for DL or no PLC data concentrator is in range. The device may then set its subband to enable its RX to be set to the next subband and listen for the superframe duration. The device may repeat the process until some beacon is obtained. If no beacon is obtained after N attempts are made, then it implies that no PLC data concentrator is available. If a beacon is received while listening to the $K^{th}$ subband, then a DL subband quality report may be generated 12 corresponding to that particular data concentrator and the received signal quality and the corresponding subband may be recorded. It may then set its subband to enable its RX to listen on subsequent subbands (as specified in the beacon packet) for the next beacon slot durations. In each such beacon slot duration, the device may record the beacon's signal quality and subband id in the DL subband quality report if a beacon is received. At the end of the beacon slot durations, the device may have completed DL subband quality report. The device will also store the information from the beacon for other uses. If a protected beacon is received, the device may use a suitable un-securing process.

At block 1030, method 1000 may include transmitting the downlink subband selection to the PLC data concentrator over one or more uplink subband corresponding to a respective CAP slot. The downlink subband selection may be transmitted, for instance, in the form of an information packet or a downlink subband selection packet. An example of such a packet is the "UL_find_data" packet. For instance, an UL subband scan may allow the device to send a generated DL subband quality report to the PLC data concentrator and also allow the concentrator to generate a UL subband quality report. During this operation, the device may use the information from the beacons received to determine the superframe structure. It may then send the subband report command frame with the generated DL subband quality report in each of the CAP slots on the corresponding subband using slotted CSMA or the like. The concentrator on reception of the frame may generate the UL subband quality report with the received signal quality per subband. The concentrator may optionally ask the device to repeat this operation multiple times as specified by a maximum number of retries ("maxULToneMaskSearchRetries") in its beacon packets, for example, to increase robustness.

At block 1035, method 1000 may include receiving a selection of one or more uplink subbands for subsequent communications sent to the PLC data concentrator. For example, similarly as above, the PLC data concentrator may perform a link quality calculation with respect to two or more received UL_find_data packets over corresponding uplink subbands (e.g., SNR, RSSI, SIR, etc.), and select one or more such subbands based on those calculations. The selection of uplink subbands may be transmitted to the PLC device via an information packet or the like. Also, such an information packet may be transmitted, for example, during a GTS slot of superframe 900.

At block 1040, method 1000 may include maintaining communications using the selected downlink and uplink subband(s). Specifically, the PLC device may receive data packets from the PLC data concentrator over the selected downlink subband(s), and it may transmit data packets to the PLC data concentrator over the selected uplink subband(s). In some embodiments, for example, ul_find_data packet may be sent over a selected UL subband. Subsequent data packets, however, may be spread over multiple subbands based on one or more coordination mechanisms.

For example, a PLC device may transmit during the CAP slot corresponding to its UL subband using slotted CSMA or during CFP using poll-based access. At all other times, it may have its receiver (RX) tuned to its DL subband. Hence the PLC device may be able to receive the frame from the PLC data concentrator during the CAP slot corresponding to the DL subband. If the device transmits a frame seeking an acknowledgement (ACK), it may tune its RX to DL subband after transmitting the frame and wait for the ACK. Similarly, the PLC data concentrator upon receiving a frame with ACK request may tune its transmitter (TX) to the DL subband of the device and transmit the ACK.

The PLC data concentrator may transmit the frames for a device during the CAP of its DL subband. Also, if it requests an ACK for the transmission, it may tune its RX to the UL subband of the device and wait till the ACK timeout. The device upon receiving a frame with ACK request may tune its TX to the UL subband and transmit the ACK.

In some embodiments, at least certain operations included in method 1000 may be repeated after predetermined time-intervals and/or upon the occurrence of a specified event. For example, upon detection of degradation in downlink communications (e.g., link quality falls below a threshold value, no signal is received for a predetermined amount of time, etc.), the PLC device may detect and/or re-evaluate the downlink subbands, and transmit a new selection to the PLC data concentrator. Conversely, the PLC device may also receive a new uplink subband selection from the PLC data concentrator after having established initial communications.

In some cases, one or more PLC devices and/or data concentrators may be configured to operate in wideband mode. In those cases, some of the techniques described above (e.g., method 1000) may be further modified. In that regard, FIG. 11 is a diagram of a superframe suitable for wide band PLC communications according to some embodiments. As illustrated, superframe 1100 includes plurality of beacon slots $B_{1-N}$ followed by a single CAP slot, which is in turn followed by a GTS slot. In contrast with superframe 900, here during the CAP slot all PLC devices may perform an uplink transmission to the PLC data concentrator over any available uplink subband. As such, each beacon packet transmitted over a corresponding one of beacon slots $B_{1-N}$ may identify a single CAP slot. Moreover, each PLC node may transmit UL_find_data packets to the PLC data concentrator over each of the UL subbands during the corresponding CAP slot.

FIG. 12 is a flowchart of discovery operations performed by a PLC data concentrator. In some embodiments, method 1200 may be performed in connection with superframe 900 described in FIG. 9 (e.g., in narrowband mode) and/or superframe 1100 described in FIG. 10 (e.g., in wideband mode). At block 1205, method 1200 may include transmitting one or more beacon packets over each of a plurality of downlink subbands during beacon slots. At block 1210, method 1200 may include receiving one or more downlink subband selection or information packets (e.g., UL_find_data packets) from at least one PLC device over a given CAP slot. In some implementations, the downlink subband selection packet may indicate which downlink subband(s) to be used in subsequent communications with the PLC device. However, in some cases, the PLC concentrator may select only a subset of identified downlink subbands, and therefore use fewer than all subbands originally identified or selected by the PLC device in subsequent downlink communications. Moreover, in other implementations, the downlink subband selection packet may indicate include channel quality information (e.g., SNR, RSSI, SIR, etc.) for each downlink subband, and the PLC concentrator may select any or a number of the downlink subbands on its own, for example, to optimize downlink traffic (e.g., data rates, etc.) to a plurality of PLC devices.

At block 1215, method 1200 may include selecting uplink subbands based, at least in part, upon the received downlink selection or information packet(s). As before, the PLC data concentrator may perform a link quality calculation with respect to two or more received UL_find_data packets over corresponding uplink subbands and select one or more such subbands based on those calculations. Then, at block 1220, method 1200 may transmit an indication of the selected uplink subband(s) to the PLC device in the form of an information packet or the like. For example, subband allocation may allow the PLC data concentrator to inform the PLC device of good or optimal DL and/or UL subband selections. Once the concentrator decides on the subbands, it may then inform it to the PLC device using a subband allocation command frame. Upon reception of this frame, the PLC device may set its DL and UL tone masks accordingly. Since every node may tune its receiver to the tone mask corresponding to a CAP slot during the CAP slot period, each node may be able to receive a tone mask allocation command.

At block 1225, method 1200 may include maintaining communications using the selected downlink and uplink subband(s). Particularly, the PLC data concentrator may receive data packets from the PLC device over the selected uplink subband(s) and it may transmit data packets to the PLC device over the selected downlink subband(s). Similarly as described above, at least certain operations of method 1200 may be performed after predetermined time-intervals and/or upon the occurrence of a specified event.

Upon completion of the network discovery and subband search operations described above, the PLC data concentrator and the PLC devices are then made aware of appropriate downlink and uplink subbands to be used. When in narrowband operation, each PLC device may transfer data to the PLC data concentrator during CAP slot(s) corresponding to the selected uplink subband(s). In some embodiments, uplink data transfers may be performed using CSMA, slotted CSMA, or the like. Further, uplink data transfers may also be performed using a GTS mechanism. For example, a GTS request may be sent using slotted CSMA during a given CAP slot, and data may be transmitted during the allocated GTS slot (if such is allocation is actually made by the PLC data concentrator). If the data transmission or protocol requires an acknowledgement (ACK), the ACK packet may be sent by the PLC data concentrator to the PLC device using an immediate or delayed/block ACK, for instance, during the GTS slot. In the downlink direction, the PLC data concentrator may transmit data to PLC devices, for example, during the GTS slot using the downlink subband(s) selected by or otherwise associated with each respective PLC device.

In some embodiments, the use of multiple beacon slots in superframe 900, for example, may be used to limit the number of PLC devices contending for the channel at a given time, even in PLC networks that do not require subbanding. For example, FIG. 13 is a diagram of a portion of a superframe 1300 illustrating PLC device allocations according to some embodiments. Here, a PLC data concentrator may allocate certain devices to selected CAP slots and/or uplink subbands. For sake of illustration, the CAP1 slot is allocated to PLC devices 1-4, the CAP2 slot is allocated to PLC devices 5-8, and the CAP3 slot is allocated to PLC devices 9-12. In other words, during steady state operation (although not necessarily during discovery and/or subband selection), only PLC devices 1-4 contend over the uplink subband(s) allocated to CAP1, only PLC devices 5-8 contend over the uplink subband(s) allocated to CAP2, and only PLC devices 5-8 contend over the uplink subband(s) allocated to CAP3.

If the PLC network does not require subbanding, the mapping of PLC devices to a given CAP slot may be left to the implementation. Moreover, limiting the number of contenders during a given time may reduce the probability of collisions and increase data rates/throughput. Also, a PLC device may only need to be active during its assigned CAP slot and during portions of the GTS slot. Therefore, in some cases, a PLC device or node may enter a power saving mode during other times.

In that regard, FIG. 14 is a flowchart of power saving operations performed by a PLC device according to some embodiments. At block 1405, method 1400 may include identifying CAP slots, for example, by performing operations similar to blocks 1005-1015 in FIG. 10. Then, at block 1410, method 1400 may include identifying selected uplink subbands, for example, by performing operations similar to block 1035, also shown in FIG. 10. Then, at block 1415, method 1400 may include entering a power saving mode at least during one or more CAP slots that do not correspond to the selected uplink subband(s). For example, the PLC device may power down at least a portion of its circuitry (e.g., a receiver stage, etc.) during those times.

In various embodiments, a combination of subbands is made possible, for example, for downlink transmissions (i.e., PLC data concentrators to PLC devices), for GTS transmissions, and/or for frequency sharing by different links (blind to each other) on the CAP slot(s). For example, in some implementations, a same packet may be spread over two or more subbands. If the transmitter is the domain master (e.g., a data concentrator) and the receiver is an endpoint, both the transmitter and the receiver know which subbands are usable. Thus, the transmitter may spread the available information on to the appropriate band(s) and the receiver may scan for packet transmission on pre-known combination(s) of band(s). If, however, the transmitter is an endpoint and the receiver is the domain master, the receiver may not know in during the CAP on which subbands to expect a packet. However, spreading may still be used during the GTS slot under control of the domain master. Also, in some cases, a receiver capable of searching for a packet in any combination of subbands during CAP slot(s) may utilize specially designed of preambles and headers in the physical layer (PHY). For example, in some embodiments, the PHY preamble and/or header may be be transmitted in only the corresponding UL subband for a particular CAP slot. Further, the preamble and/or header may contain information as to which subbands the following data frame is spread across.

In some implementations, two or more different packets may be sent by the same transmitter over a plurality of different subbands to either the same or different receivers. For instance, the MAC-PHY interface may be appropriately defined to support a command to transmit different packets, each associated with a subband (typically this interface contains just one packet). Also, carrier sense on different subbands may run with different timing. Accordingly, a packet may be transmitted when all subbands are free and/or the $i^{th}$ packet may be transmitted when the $i^{th}$ subband is free.

In other implementations, two or more different packets may be sent by two or more transmitters over a plurality of different subbands to either the same or different receivers. In case where the packets are sent to the same receiver, the receiver may be configured to detect packets simultaneously on different bands, for example, as an optional mode of operation for the device. Such an implementation may be similar to having different PHY-MACs, each on a different subband. It may also be used in conjunction with delayed ACK (so that not all ACK packets are expected simultaneously so that their timing need not be synchronized). Conversely, in a case where the packets are sent to different receivers, a frequency multiplexing technique may be employed, for example, during CAP slots.

As noted above, in certain embodiments, systems and methods for designing, using, and/or implementing MAC protocols with subbanding may be executed, at least in part, by one or more PLC devices and/or computer systems. One such computer system is illustrated in FIG. 15. In various embodiments, system 1500 may be implemented as a PLC device, PLC modem, PLC data concentrator, server, a mainframe computer system, a workstation, a network computer, a desktop computer, a laptop, mobile device, or the like. In different embodiments, these various systems may be configured to communicate with each other in any suitable way, such as, for example, via a local area network or the like.

As illustrated, system 1500 includes one or more processors 1510 coupled to a system memory 1520 via an input/output (I/O) interface 1530. Computer system 160 further includes a network interface 1540 coupled to I/O interface 1530, and one or more input/output devices 1525, such as cursor control device 1560, keyboard 1570, display(s) 1580, and/or mobile device 1590. In various embodiments, computer system 1500 may be a single-processor system including one processor 1510, or a multi-processor system including two or more processors 1510 (e.g., two, four, eight, or another suitable number). Processors 1510 may be any processor capable of executing program instructions. For example, in various embodiments, processors 1510 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 1510 may commonly, but not necessarily, implement the same ISA. Also, in some embodiments, at least one processor 1510 may be a graphics processing unit (GPU) or other dedicated graphics-rendering device.

System memory 1520 may be configured to store program instructions and/or data accessible by processor 1510. In various embodiments, system memory 1520 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in the figures above, may be stored within system memory 1520 as program instructions 1525 and data storage 1535, respectively. In other embodiments, program instructions and/or data may be received, sent or stored upon different types of computer-accessible media or on similar media separate from system memory 1520 or computer system 1500. Generally speaking, a computer-accessible medium may include any tangible storage media or memory media such as magnetic or optical media—e.g., disk or CD/DVD-ROM coupled to computer system 1500 via I/O interface 1530. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 1540.

In one embodiment, I/O interface 1530 may be configured to coordinate I/O traffic between processor 1510, system memory 1520, and any peripheral devices in the device, including network interface 1540 or other peripheral interfaces, such as input/output devices 1550. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. In addition, in some embodiments some or all of the functionality of I/O interface 1530, such as an interface to system memory 1520, may be incorporated directly into processor 1510.

Network interface 1540 may be configured to allow data to be exchanged between computer system 1500 and other devices attached to a network, such as other computer systems, or between nodes of computer system 1500. In various embodiments, network interface 1540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1550 may, in some embodiments, include one or more display terminals, keyboards, keypads, touchpads, scanning devices, voice or optical recognition devices, mobile devices, or any other devices suitable for entering or retrieving data by one or more computer system 1500. Multiple input/output devices 1550 may be present in computer system 1500 or may be distributed on various nodes of computer system 1500. In some embodiments, similar input/output devices may be separate from computer system 1500 and may interact with one or more nodes of computer system 1500 through a wired or wireless connection, such as over network interface 1540.

As shown in FIG. 15, memory 1520 may include program instructions 1525, configured to implement certain embodiments described herein, and data storage 1535, comprising various data accessible by program instructions 1525. In an embodiment, program instructions 1525 may include software elements of embodiments illustrated in the above figures. For example, program instructions 1525 may be implemented in various embodiments using any desired programming language, scripting language, or combination of programming languages and/or scripting languages (e.g., C, C++, C#, JAVA®, JAVASCRIPT®, PERL®, etc.). Data storage 1535 may include data that may be used in these embodiments (e.g., recorded communications, profiles for different modes of operations, etc.). In other embodiments, other or different software elements and data may be included.

A person of ordinary skill in the art will appreciate that computer system 1500 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

It will be understood that various operations discussed herein may be executed simultaneously and/or sequentially. It will be further understood that each operation may be performed in any order and may be performed once or repetitiously. In various embodiments, the operations discussed herein may represent sets of software routines, logic functions, and/or data structures that are configured to perform specified operations. Although certain operations may be shown as distinct logical blocks, in some embodiments at least some of these operations may be combined into fewer blocks. Conversely, any given one of the blocks shown herein may be implemented such that its operations may be divided among two or more logical blocks. Moreover, although shown with a particular configuration, in other embodiments these various modules may be rearranged in other suitable ways.

Many of the operations described herein may be implemented in hardware, software, and/or firmware, and/or any combination thereof. When implemented in software, code segments perform the necessary tasks or operations. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc. Software code segments may be stored in any volatile or non-volatile storage device, such as a hard drive, flash memory, solid state memory, optical disk, CD, DVD, computer program product, or other memory device, that provides tangible computer-readable or machine-readable storage for a processor or a middleware container service. In other embodiments, the memory may be a virtualization of several physical storage devices, wherein the physical storage devices are of the same or different kinds The code segments may be downloaded or transferred from storage to a processor or container via an internal bus, another computer network, such as the Internet or an intranet, or via other wired or wireless networks.

Many modifications and other embodiments of the invention(s) will come to mind to one skilled in the art to which the invention(s) pertain having the benefit of the teachings presented in the foregoing descriptions, and the associated drawings. Therefore, it is to be understood that the invention(s) are not to be limited to the specific embodiments disclosed. Although specific terms are employed herein, they are used in a generic and descriptive sense only and not for purposes of limitation.

The invention claimed is:

1. A method comprising:
performing, by a first power line communication (PLC) device,
receiving a beacon packet from a second power line communication (PLC) device during one of a plurality of beacon slots of a superframe structure, each of the plurality of beacon slots corresponding to a different one of a plurality of downlink subbands;
identifying, based on the received beacon packet, a plurality of contention access periods following the plurality of beacon slots in the superframe structure, each of the plurality of contention access periods corresponding to a different one of a plurality of uplink subbands, the plurality of uplink subbands distinct from the plurality of downlink subbands;
transmitting, to the second power line communication (PLC) device, an information packet over each of the plurality of uplink subbands during corresponding ones of the plurality of contention access periods; and
receiving, from the second power line communication (PLC) device during a guaranteed time slot following the plurality of contention access periods, an indication of a selected one of the plurality of uplink subbands to be used in a subsequent communication from the first power line communication (PLC) device to the second power line communication (PLC) device.

2. The method of claim 1, further comprising:
performing, by the first power line communication (PLC) device,
prior to receiving the beacon packet from the second power line communication (PLC) device, sequentially scanning one or more of the plurality of downlink subbands; and
selecting one of the plurality of downlink subbands to be used in the subsequent communication based, at least in part, upon the received beacon packet.

3. The method of claim 2, wherein the information packet includes an indication of the selected one of the plurality of downlink subbands.

4. The method of claim 1, further comprising:
performing, by the first power line communication (PLC) device,
receiving at least another beacon packet from the second power line communication (PLC) device during at least another of the plurality of beacon slots;
selecting among the received beacon packets based, at least in part, upon one or more link quality calculations; and
selecting one of the plurality of downlink subbands to be used in the subsequent communication corresponding to the beacon slot of the selected beacon packet.

5. The method of claim 1, wherein the information packet includes an indication of two or more beacon packets received over two or more beacon slots corresponding to respective ones of the plurality of downlink subbands, the method further comprising:
performing, by the first power line communication (PLC) device,
receiving, from the second power line communication (PLC) device during the guaranteed time slot following the plurality of contention access periods, an indication of a selected one of the plurality of downlink subbands to be used in a subsequent communication from the second communication device to the first power line communication (PLC) device.

6. The method of claim 1, further comprising:
performing, by the first power line communication (PLC) device,
transmitting at least one of a preamble or header portion of a packet to the second power line communication (PLC) device using the selected one of the plurality of uplink subbands;
transmitting a data portion of the packet to the second power line communication (PLC) device spread across two or more of the plurality of uplink subbands, the preamble or header portion of the packet configured to identify the two or more of the plurality of uplink subbands.

7. The method of claim 1, further comprising:
performing, by the first power line communication (PLC) device,
entering a power saving mode during one or more of the plurality of contention access periods not corresponding to the selected one of the plurality of uplink subbands.

8. A power line communication (PLC) modem comprising:
a processor; and
a memory coupled to the processor, the memory configured to store program instructions executable by the processor to cause the PLC modem to:
transmit a beacon packet during each of a plurality of beacon slots of a superframe, each of the beacon packets transmitted over a different downlink subband;
receive, from a first PLC device over a first set of one or more uplink subbands during a contention access period in the superframe following the plurality of beacon slots, a first set of one or more downlink subband selection packets, each of the first set of one or more downlink subband selection packets indicating a first set of one or more downlink subbands over which the first PLC device is capable of receiving beacon packets; and
transmit, to the first PLC device, a first information packet over one or more of the first set of one or more of downlink subbands during a guaranteed time slot in the superframe following the contention access period, the first information packet configured to instruct the first PLC device to use a selected one or more of the first set of one or more uplink subbands in a subsequent communication with the PLC modem.

9. The PLC modem of claim 8, wherein the processor includes a digital signal processor (DSP), an application specific integrated circuit (ASIC), a system-on-chip (SoC) circuit, a field-programmable gate array (FPGA), a microprocessor, or a microcontroller.

10. The PLC modem of claim 8, wherein each of the first set of one or more downlink subband selection packets is sequentially received across a respective one of the first set of one or more uplink subbands.

11. The PLC modem of claim 8, wherein the first set of one or more downlink subband selection packets is spread across two or more of the first set of one or more uplink subbands.

12. The PLC modem of claim 8, wherein the selected one or more of the first set of one or more uplink subbands is based, at least in part, upon a link quality calculation performed with respect to one or more of the first set of one or more downlink subband selection packets.

13. The PLC modem of claim 8, wherein the first information packet is transmitted over at least two of the first set of one or more downlink subbands.

14. The PLC modem of claim 8, wherein the first information packet is spread across two or more of the first set of one or more downlink subbands.

15. The PLC modem of claim 8, the program instructions further executable by the processor to cause the PLC modem to:
receive a second set of one or more downlink subband selection packets from a second PLC device over a second set of one or more uplink subbands during the contention access period, each of the second set of downlink subband selection packets indicating a second set of one or more downlink subbands; and
transmit, to the second PLC device, a second information packet over one or more of the second set of one or more downlink subbands during a guaranteed time slot following the contention access period, the second information packet configured to instruct the second PLC device to use a selected one or more of the second set of one or more uplink subbands in a subsequent communication with the PLC modem.

16. The PLC modem of claim 15, wherein the first set of uplink subbands overlaps, at least in part, with the second set of uplink subbands, and wherein the second information packet instructs the second PLC device to use a different set of one or more uplink subbands than the first PLC device.

17. A non-transitory electronic storage medium having program instructions stored thereon that, upon execution by a processor within a power line communication (PLC) device, cause the PLC device to:
identify a plurality of contention access periods following a plurality of beacon slots in a superframe structure, each of the plurality of contention access periods corresponding to a different one of a plurality of uplink subbands;
receive, during a guaranteed time slot following the plurality of contention access periods, an indication of a selected one or more of the plurality of uplink subbands to be used in a subsequent communication;
receive a beacon packet during at least one of the plurality of beacon slots, each beacon packet received over a different one of a plurality of downlink subbands, the plurality of downlink subbands different from the plurality of uplink subbands; and
enter a power saving mode during one or more of the plurality of contention access periods corresponding to other than the selected one or more of the plurality of uplink subbands.

18. The non-transitory electronic storage medium of claim 17, wherein to identify the plurality of contention access periods, the program instructions, upon execution by the processor, further cause the PLC device to:
receive a beacon packet during at least one of the plurality of beacon slots, each beacon packet spread over two or more of a plurality of downlink subbands, the plurality of downlink subbands different from the plurality of uplink subbands.

* * * * *